United States Patent [19]

Yeh

[11] Patent Number: 4,768,845

[45] Date of Patent: Sep. 6, 1988

[54] COMBINATION-TYPE DESK/CABINET COMPARTMENT STRUCTURE

[76] Inventor: Kuo-Huei Yeh, 70, Lane 184, Hu-Lin St., Taipei, Taiwan

[21] Appl. No.: 925,973

[22] Filed: Nov. 3, 1986

[51] Int. Cl.[4] ............................................. A47B 48/00
[52] U.S. Cl. .............................. 312/257 SK; 312/263
[58] Field of Search ............ 312/140, 257 R, 257 SK, 312/263

[56] References Cited

U.S. PATENT DOCUMENTS

| | | | |
|---|---|---|---|
| 3,346,310 | 10/1967 | Diack | 312/140 |
| 3,380,768 | 4/1968 | Wolfensberger | 312/140 X |
| 3,477,182 | 11/1969 | Fulton | 312/140 X |
| 4,136,364 | 11/1978 | Reilly | 312/257 SK X |
| 4,281,883 | 8/1981 | Zacky | 312/257 R X |
| 4,691,970 | 9/1987 | Neri | 312/257 SK |

Primary Examiner—Joseph Falk
Attorney, Agent, or Firm—Holman & Stern

[57] ABSTRACT

The present invention relates to a combination-type desk/cabinet compartment structure, particularly relates to various easily, simply and quickly combined display cabinets and desks with economical, beautiful and practical compartment through the multi-directional and multi-angular corner connector in keeping with the aluminum-extruded hollow skeleton and such components as plate member and glass.

14 Claims, 26 Drawing Sheets

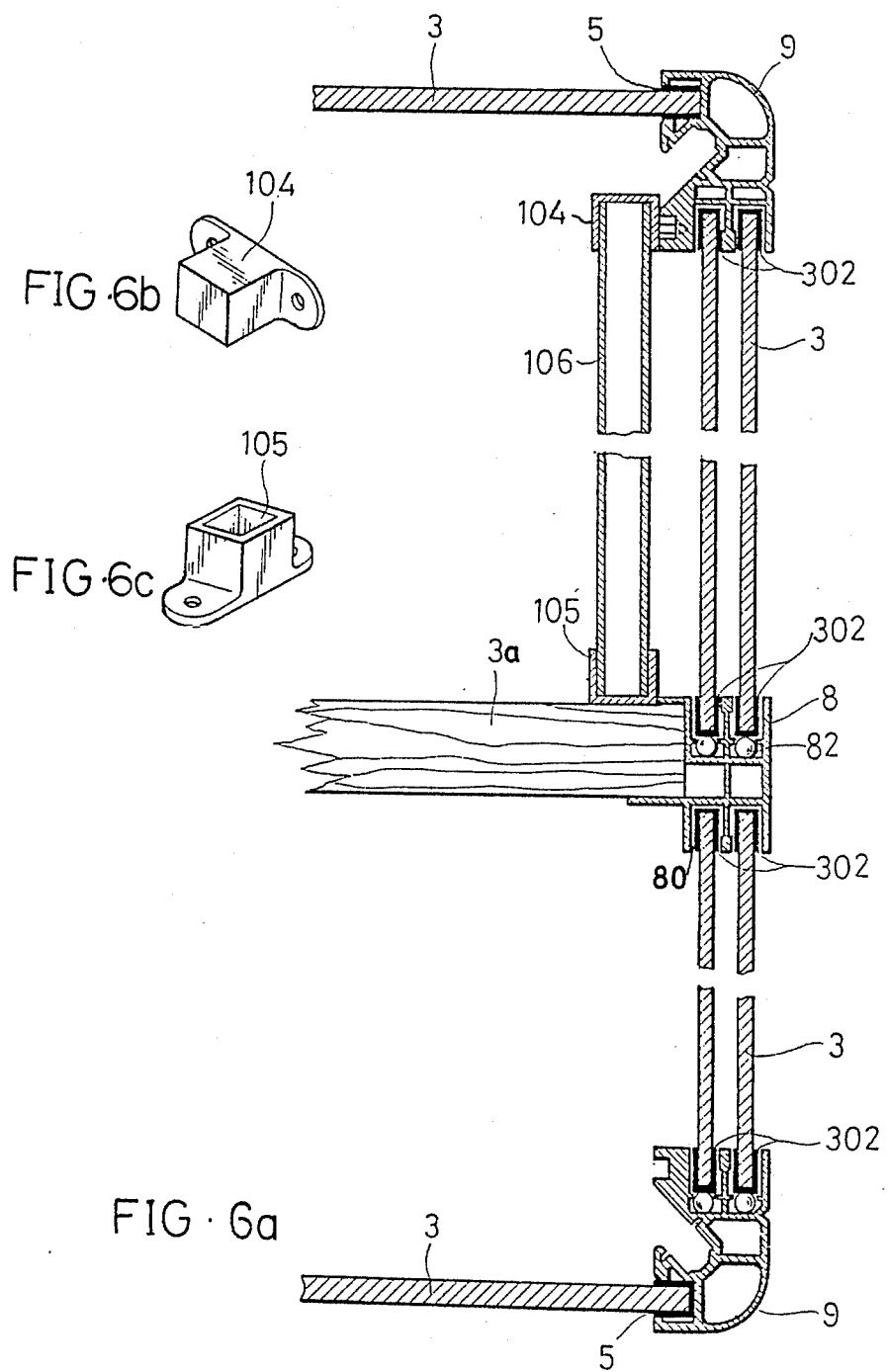

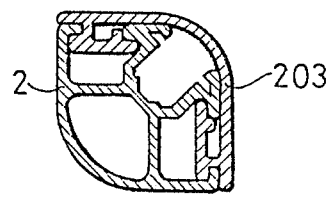
FIG·20
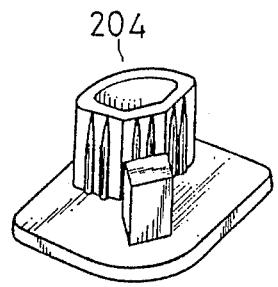
FIG·21

FIG·24

FIG·28
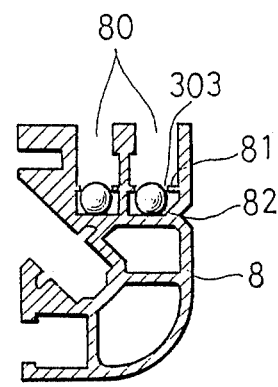
FIG·29

COMBINATION-TYPE DESK/CABINET COMPARTMENT STRUCTURE

BACKGROUND OF THE INVENTION

1. Field of the Invention

The present invention relates to a combination-type desk/cabinet compartment structure, and more particularly relates to various easily, simply and quickly combined display cabinets and desks with economical, beautiful and practical compartments by the use of corner connectors interchangeable with aluminum-extruded hollow skeletons, plate members and glass.

2. Description of the Prior Art

The conventional combination-type cabinet or compartment device has only a single function, namely, the combination-type structure can only be combined into a fixed end product, but cannot be changed into other combination patterns for other purposes. Television set and display shelves combined with stainless steel pipes are available in the market, but are too rough and it is impossible to install glass, acrylic, etc. thereon. Therefore, fixed cabinets made of glass, acrylic, or wood are preferably used for the display of merchandise to achieve beauty and elegance; however, their dimensions are fixed and cannot be varied to suit the surroundings or other designs.

BRIEF SUMMARY OF THE INVENTION

It is an object of the invention to overcome the foregoing drawbacks and provide a combination-type desk/cabinet compartment structure of improved design.

The primary object of this invention is to provide a combination-type desk/cabinet compartment structure which may be made into a suitable arrangement with variable dimensions by corner connectors which are interchangeable with hollow skeletal members which can be assembled for the purpose of display.

The secondary object of this invention is to provide a combination-type desk/cabinet compartment structure having integral beauty and which avoids the sense of roughness through precise structure for insertion of some elements into others.

Another object of this invention is to provide a combination-type desk/cabinet compartment structure which may be combined and converted into desks, cabinets, display shelves, etc. with various angles and suitable compartments.

BRIEF DESCRIPTION OF THE DRAWINGS

The invention will now be described in detail with reference to the accompanying drawings wherein:

FIG. 6a is a cross-sectional view of the movable plate member combination of this invention;

FIGS. 6b and 6c are perspective views of parts used in the embodiment of FIG. 6a;

FIG. 20 is a cross-sectional view showing a decorative plate member of this invention;

FIG. 21 is a perspective view of the skeleton pad of this invention;

FIG. 28 is a cross-sectional view of an abrasion-resistant rubber pad of this invention;

FIG. 29 is a cross-sectional view of a multi-track hollow skeleton of this invention;

DETAILED DESCRIPTION OF THE PREFERRED EMBODIMENT

Figure 1:
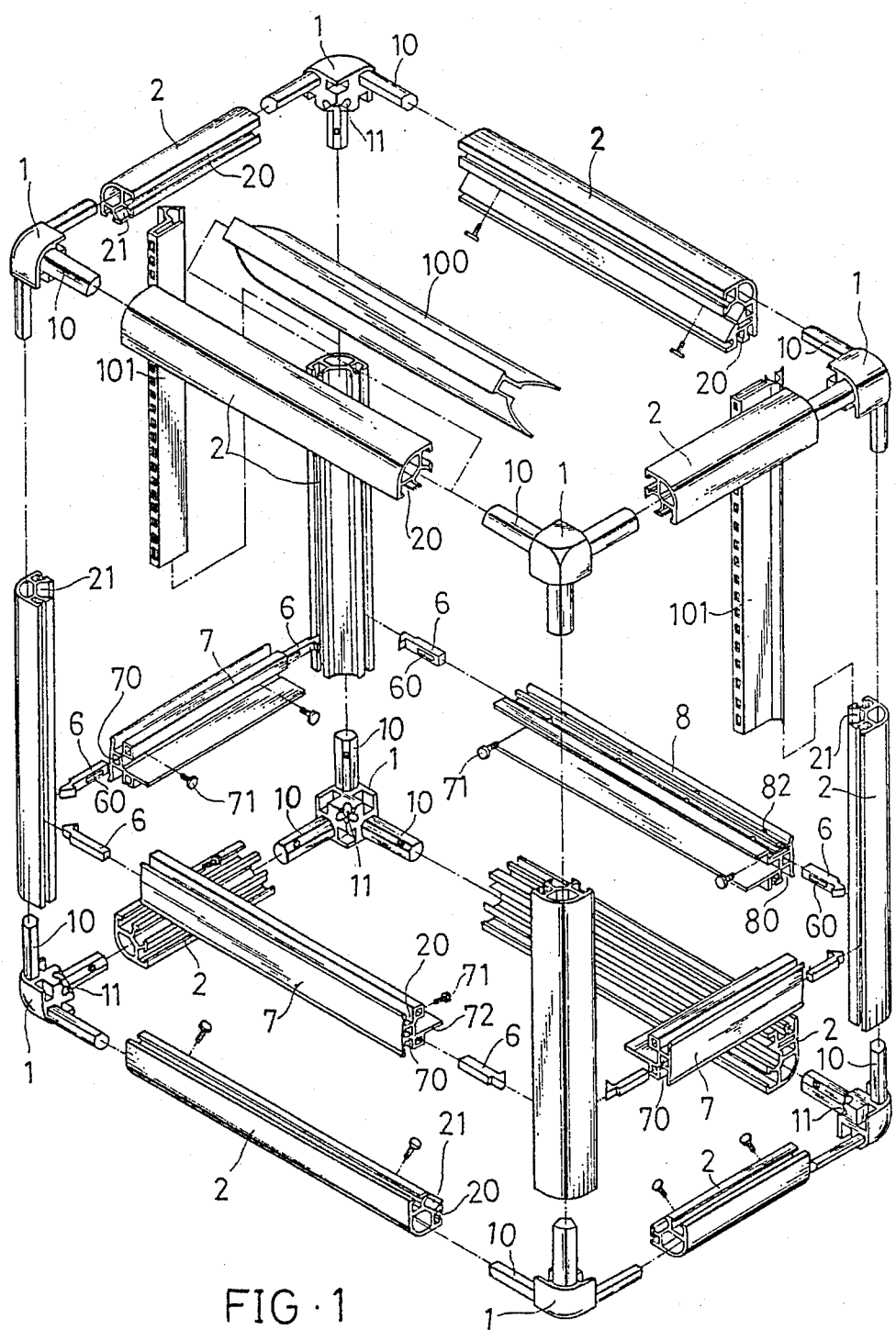
FIG. 1 is an exploded perspective view of skeletal parts of this invention.
Figure 2:
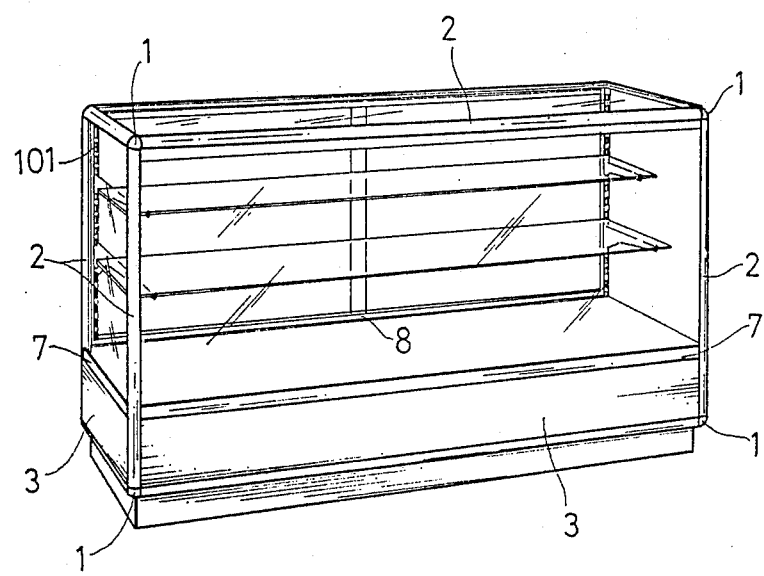
FIG. 2 is a perspective view of an example of an assembled cabinet of this invention.
Figure 3:
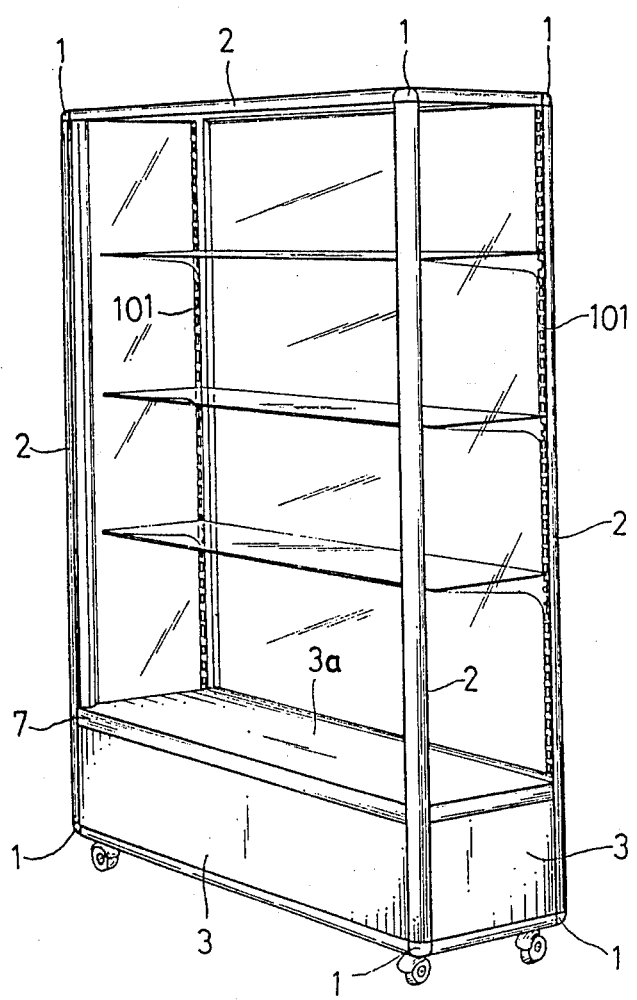
FIG. 3 is a perspective view of another embodiment of this invention.
Figure 4:
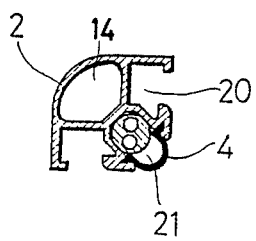
FIG. 4 is a cross-sectional view of a hollow skeleton engaging with a power source.
Figure 11:
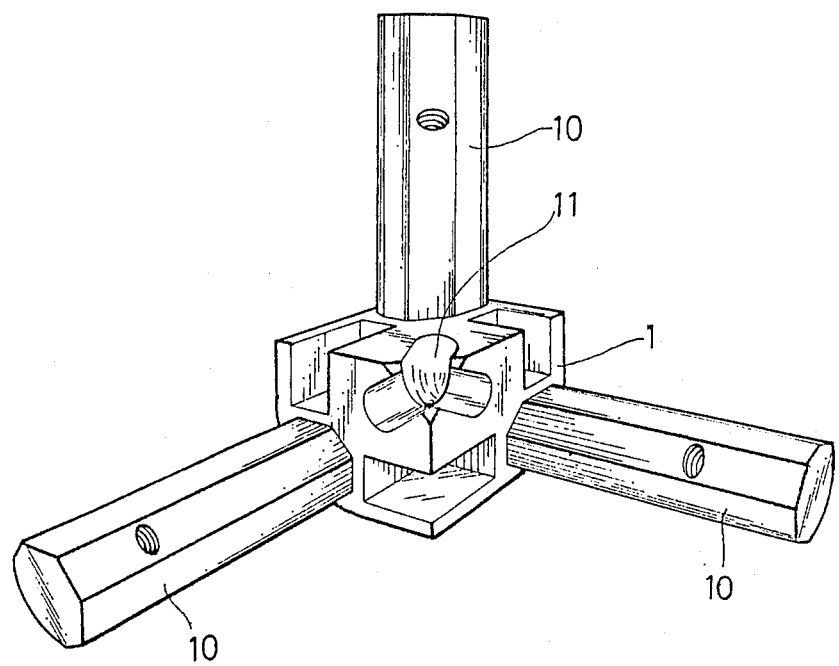
FIG. 11 is a perspective view of the corner connector of this invention.

As shown in FIGS. 1, 2 and 3, this invention comprises a plurality of corner connectors 1 with projecting engaging bars 10, a plurality of aluminum-extruded hollow skeletons, or skeletal frame members, 2 with plate member inserting grooves 20, hollow sections 14 for receiving engaging bars 10, and a plurality of plate members 3 for locking the foregoing elements together. A slot 21 in the shape shown in FIG. 4 is in the position between two plate member inserting grooves 20 on the hollow skeleton 2 and may communicate with the slot 21 in another hollow skeleton 2 connected to the same corner connector 1 through slot 11 of the corner connector 1 (as shown in FIG. 11), so a power source wire may be installed through this slot 21. A stopper, or retainer, 4 is provided to cover the said wire to maintain the neatness and beauty of this invention. When engaging the hollow skeleton 2 with the plate member 3, a bevel plastic thimble 5 having a U-shaped cross-section with a concave-convex wall can be engaged firmly in the plate member inserting groove 20 as shown in FIG. 5.

Figure 7:
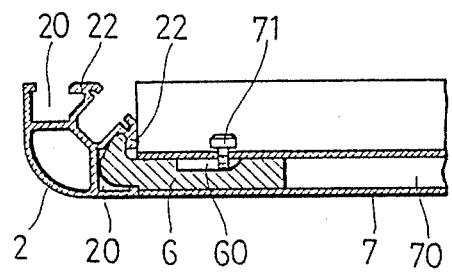
FIG. 7 is a cross-sectional view of the combination of the central hollow skeletons of this invention.
Figure 24:
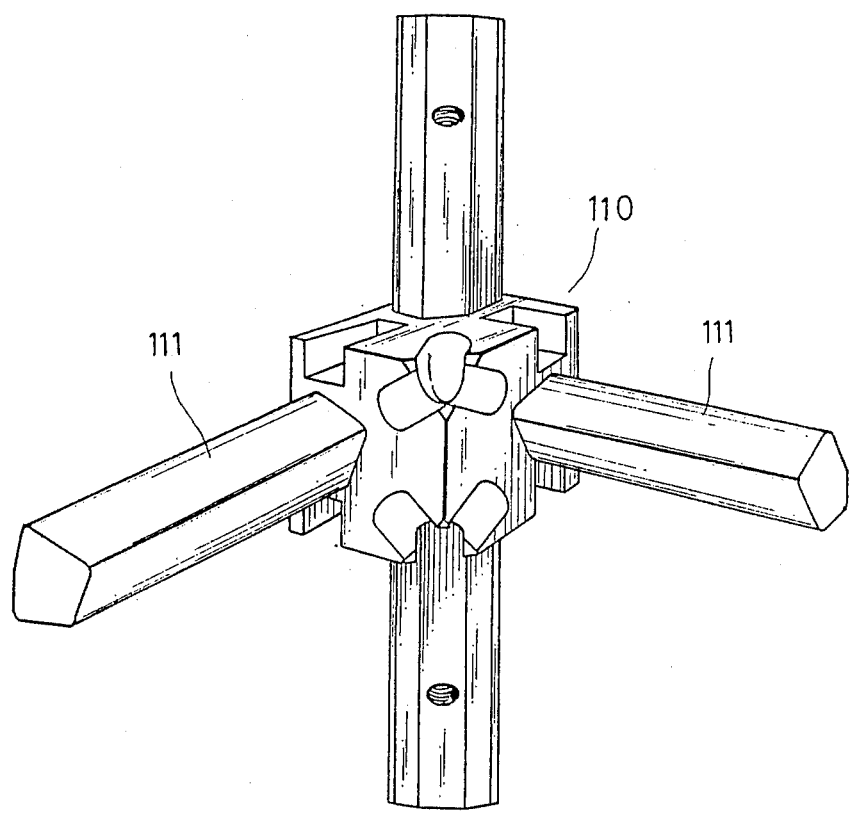
FIG. 24 is a perspective view of the quadridirectional corner connector of this invention.

When dividing this invention into upper and lower layers, except using the quadridirectional corner connector 110 as shown in FIG. 24, a hooked bar element 6 can be snapped into the plate member inserting groove 20 as shown in FIG. 7 and blocked by a stop edge 22 on the inner side of groove 20 to prevent the hooked bar 6 from coming off. Since there is a bevel groove 60 on the hooked bar 6, when the hollow 70 of central hollow skeleton 7 is engaged with the hooked bar 6 and locked with a screw 71, the hooked bar 6 is forced outwardly to tightly clamp the plate member inserting groove 20 of hollow skeleton 2. The top end of screw 71 is used to tighten the screw which engages at its inner end with bevel groove 60. In addition, the upper and lower plate member inserting grooves 20 on the central hollow skeleton 7 are designed to insert the upper and lower plate members 3 therein, respectively, and plate members 3a may be laterally positioned through a stop block 72 as shown in FIG. 5.

Figure 8:
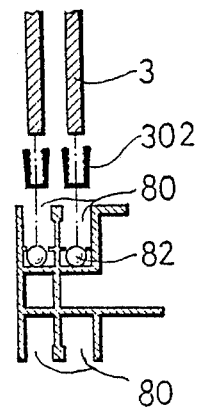
FIG. 8 is a cross-sectional view of the double-track hollow skeleton of this invention.
Figure 33:
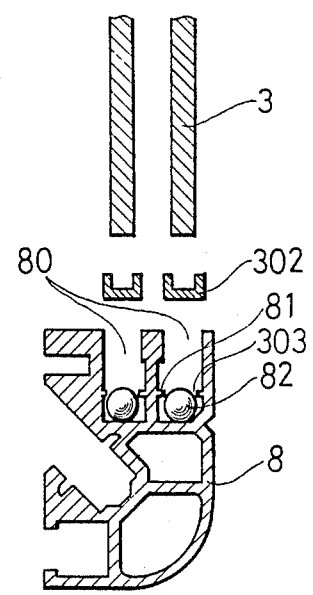
FIG. 33 is a view similar to FIG. 29 showing additional components of the double-track hollow skeleton embodiment of this invention.

In consideration of arranging a slidable and openable plate member 3, a multi-track hollow skeleton 8 can be used as shown in FIG. 8. The skeleton 8 is similar to the hollow skeleton 7 but has a plurality of inner and outer plate member inserting grooves 80. When the multi-track hollow skeleton 8 is in the lower position for engagement, a groove 303, as shown in FIGS. 29 and 33, may be provided below stopper element 81 at the bottom of each inserting groove 80. The width of groove 303 is such that ball elements 82 placed therein, from the front and rear ends, may slightly project through stopper 81 but cannot slip out of groove 303, and a suitable length portion of the stopper 81 is made into a slightly downward concave form to limit the balls 82 to slide in the given range and to prevent the balls 82 from gathering toward one direction, or at some recess. Therefore, when the plate members 3 of inner and outer layers move toward a single direction, an opening may be formed; otherwise, the desk/cabinet is closed. Furthermore, the multi-track central hollow skeleton 8 may replace the central hollow skeleton 7 for a compartment structure having slidably openable panels or plate members 3 above and below as shown in FIG. 6.

Figures 5A, 5B:
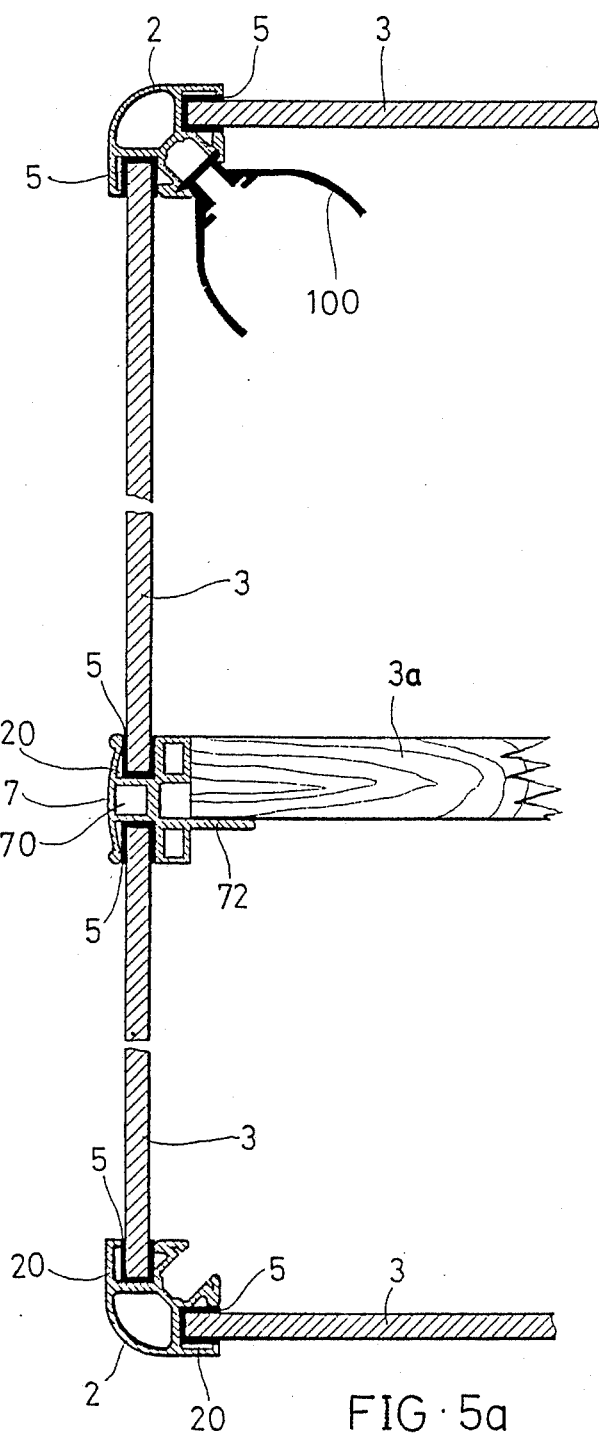
FIG. 5a is a cross-sectional view of the fixed plate member combination of this invention.
FIG. 5b is a cross-sectional view of an insert member used in the embodiment of FIG. 5.
Figure 9:
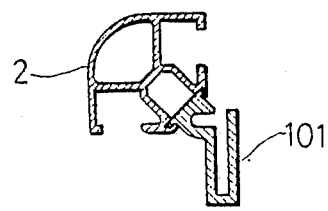
FIG. 9 is a cross-sectional view of the assembled portion of a stanchion of this invention.
Figure 10:
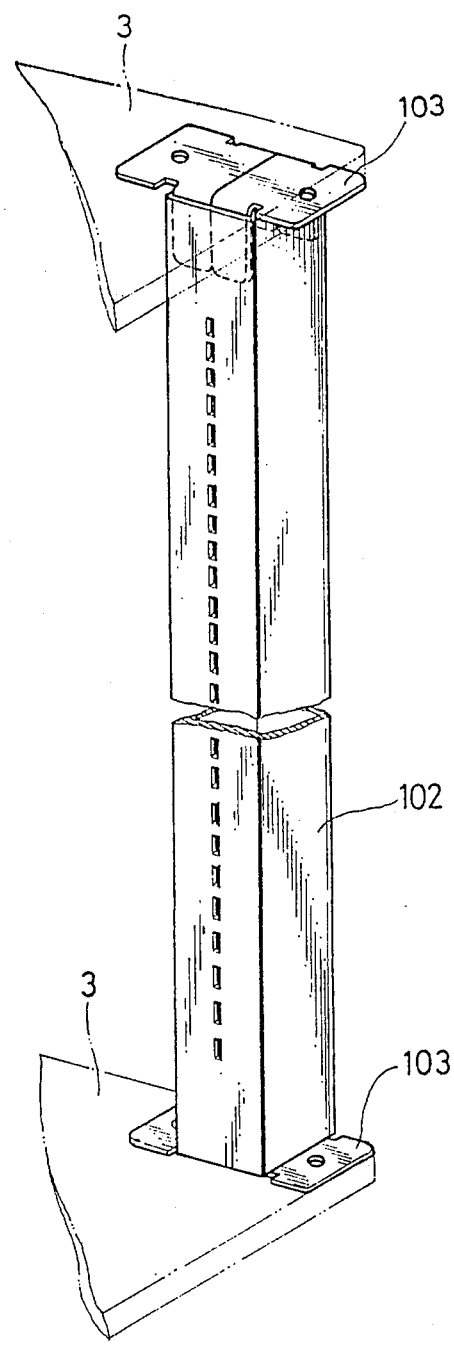
FIG. 10 is a perspective view of the long stanchion assembly of this invention.
Figure 14:
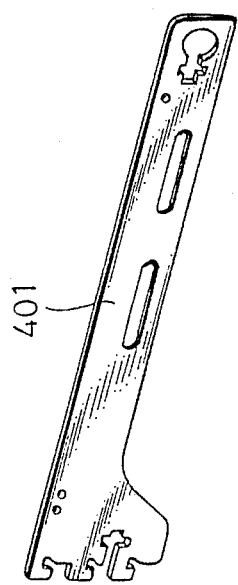
FIG. 14 is a perspective view of a support arm for the showcase of this invention.

A lamp shade 100 may be engaged in slot 21 as shown in FIGS. 1 and 5 for installing a lamp tube, and a stanchion 101 may engage in slot 21, as shown in FIGS. 1 and 9, having slots for engaging the support arm 401 (FIG. 14) for a display shelf. Where the display shelves are high or heavy, as shown in FIG. 3, a long tubular stanchion 102 may be securely fixed at its ends onto locking seat 103 for support as shown in FIG. 10. In order to avoid the hollow skeleton 2 being too long for lateral support and tending toward dropping down at the center thereof, a support rod 106 may be engaged between an upper holder 104 locked on the hollow skeleton 2 and a lower holder 105 locked on the plate member 3a for support as shown in FIG. 6.

In order to further conveniently use this invention, the projecting bars 10 on the corner connector 1 may be a plurality of bars such as 3, 4, 5, 6, 7 and 8, and the angles therebetween are not limited to 90°. In the case of 120°, corner connectors can be made available such as shown in FIGS. 11 and 24.

Figure 12:
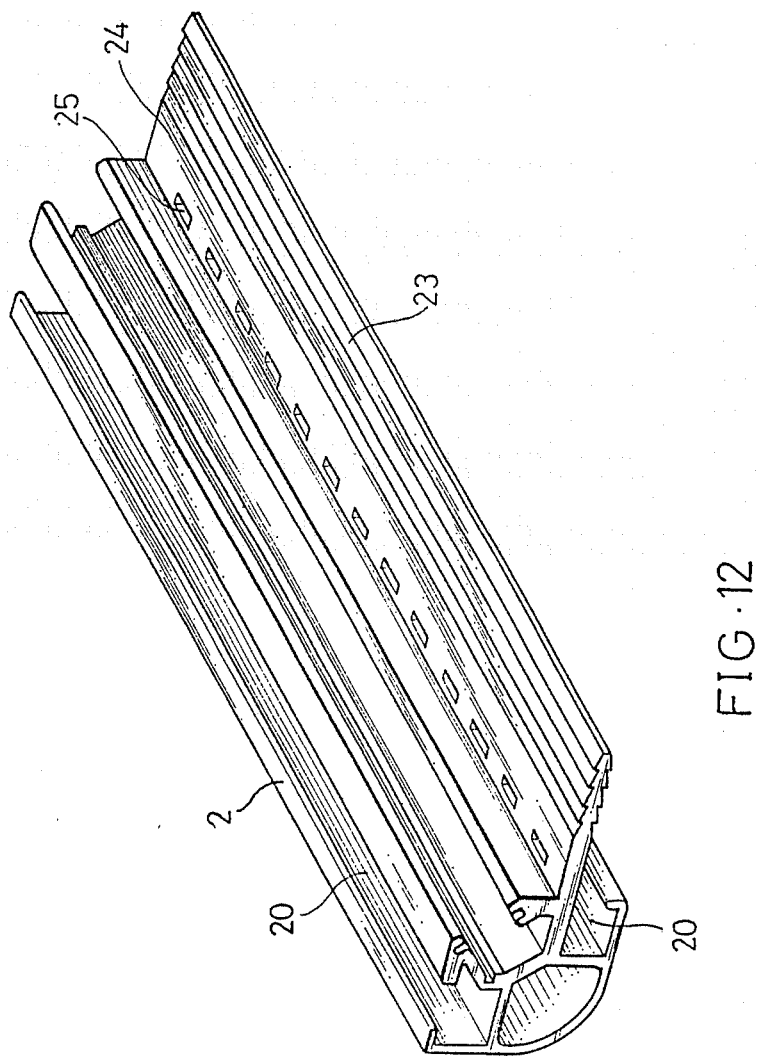
FIG. 12 is a perspective view of an embodiment of the hollow skeleton of this invention.
Figure 13:
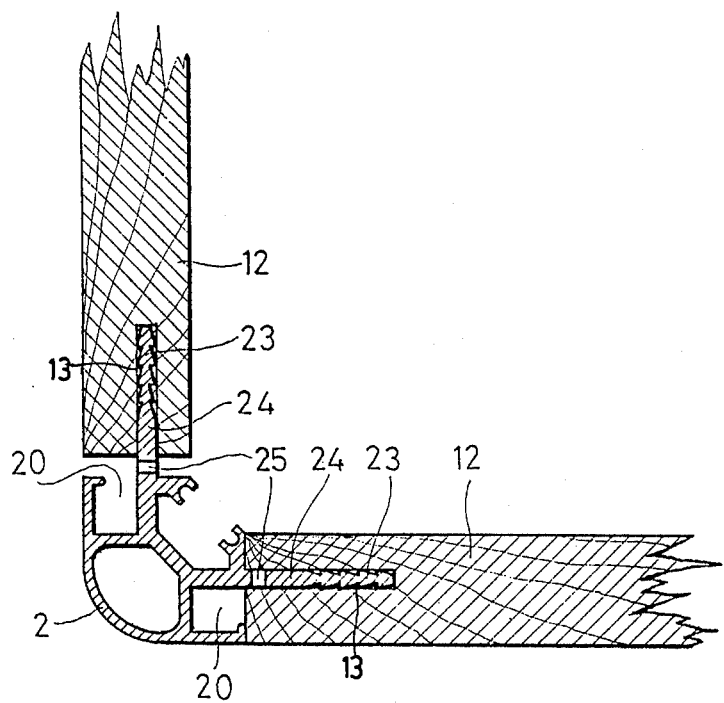
FIG. 13 is a cross-sectional view of another embodiment of the hollow skeleton of this invention.

Other examples of this invention are shown in FIGS. 12 and 13, wherein an end member 24 with rack 23 may extend from the inner end surface of inserting groove 20 on one or two sides of the hollow skeleton 2, and a row of inserting holes 25 are disposed adjacent to the end member 24 and inserting groove 20. Since the hollow skeleton 2 has the end member 24 and the support frame edge is widened, the suspension strength of plate member 3 such as glass or acrylic plate disposed in the inserting groove 20 is enhanced to make the plate member 3 more stable without moving around but with better security. An inserting groove 13 may be provided at the center of the side edge of wooden plate 12 for receiving the end member 24 at the face for bearing heavier things such as a chair or cabinet if the wooden plate 12 is inserted therein.

Figure 15:
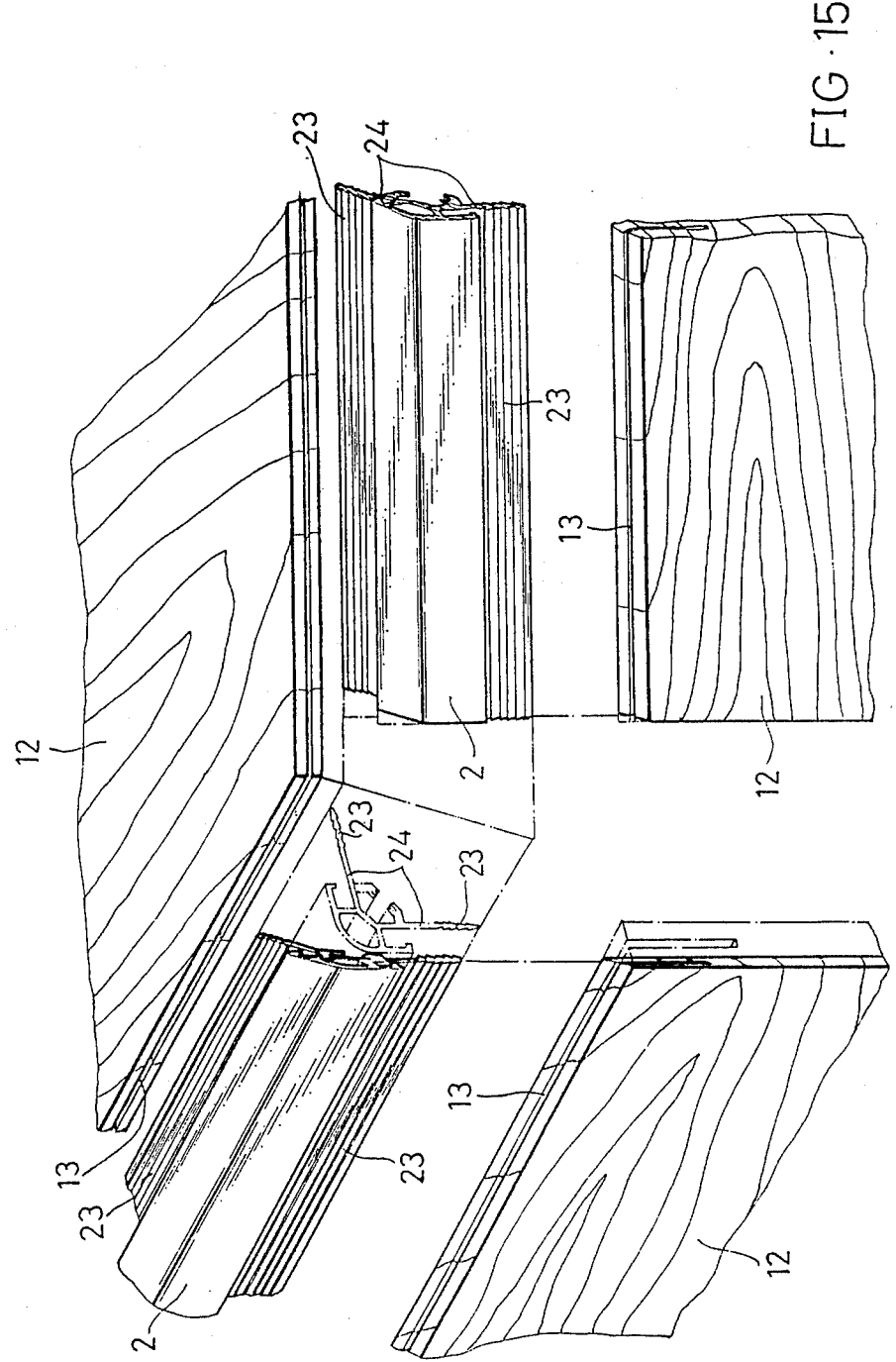
FIG. 15 is an exploded view of this invention showing special angles for the hollow skeleton.

As shown in FIG. 15, this invention can be arranged as a desk/cabinet in need of no 90° corner connector 1 through trimming the position of engagement of two hollow skeletons 2 and wooden plates 12.

Figure 16:
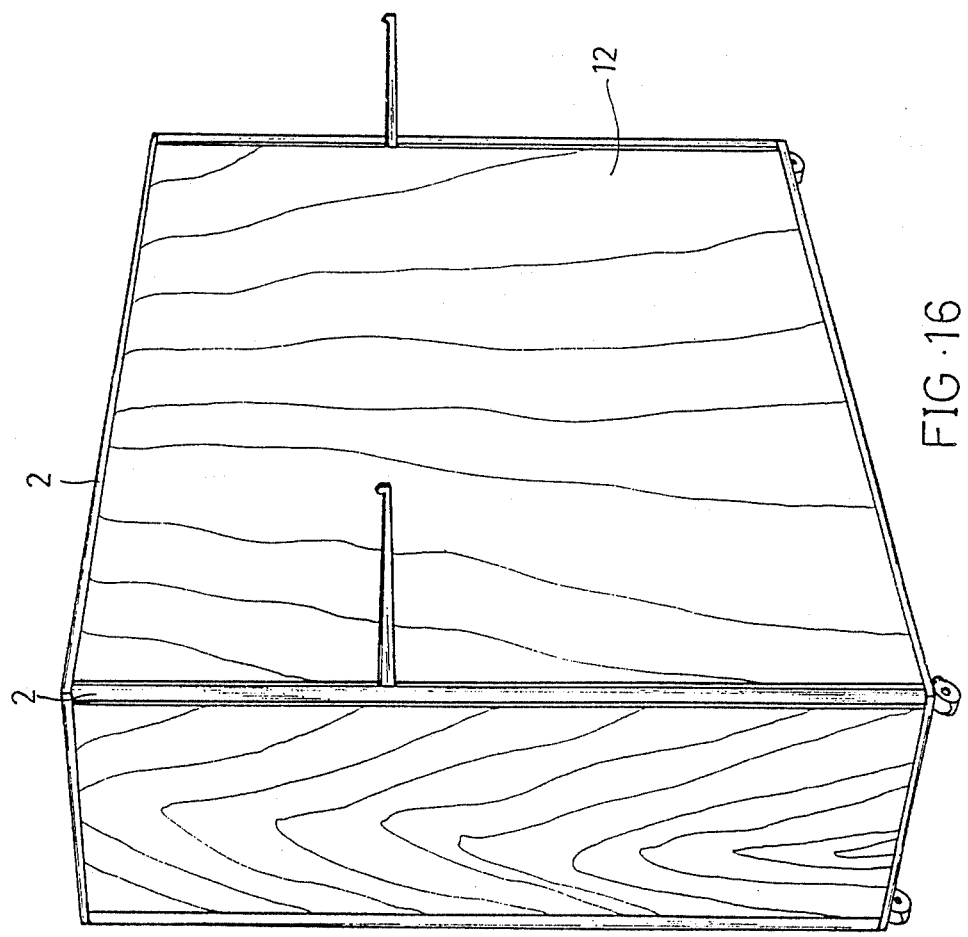
FIG. 16 is a perspective view of attached showcase of this invention.
Figure 34:
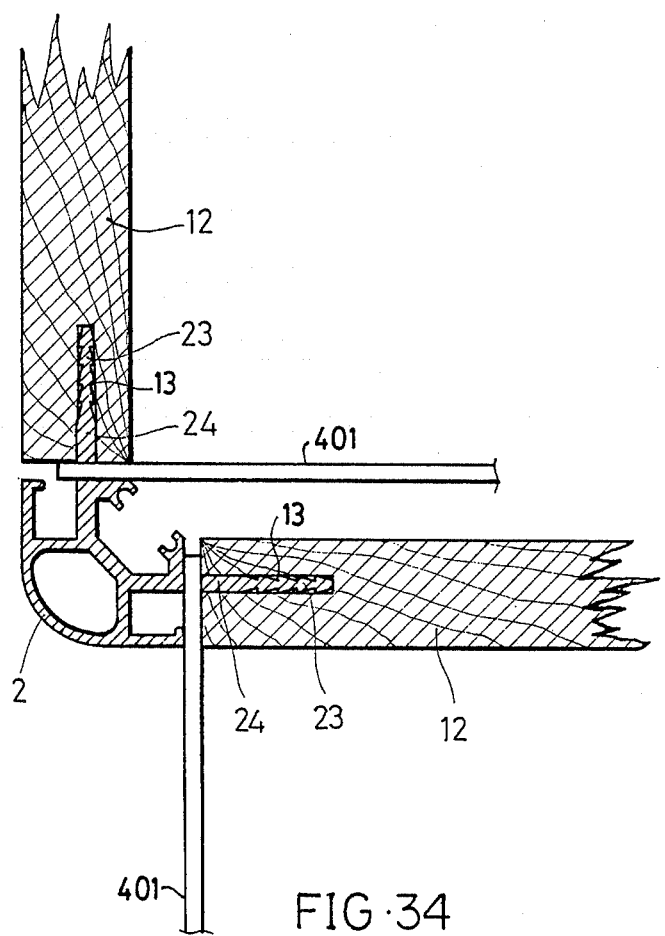
FIG. 34 is a cross-sectional view of another embodiment of this invention.

As shown in FIGS. 16 and 34, the inserting groove on wooden plate 12 may be made slightly shorter than the end member 24, so that the wooden plate 12 is not tightly engaged against the hollow skeleton 2 when assembled, but a clearance is left therebetween, so that display shelf support arm 401 may be inserted in inserting holes 25 on the member 24 from within or without through this clearance for the purpose of expanding the display space from within or without.

Figure 17:
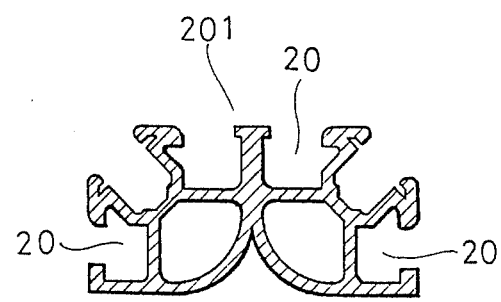
FIG. 17 is a cross-sectional view of a parallel, bidirectional, hollow skeleton of this invention.
Figure 18:
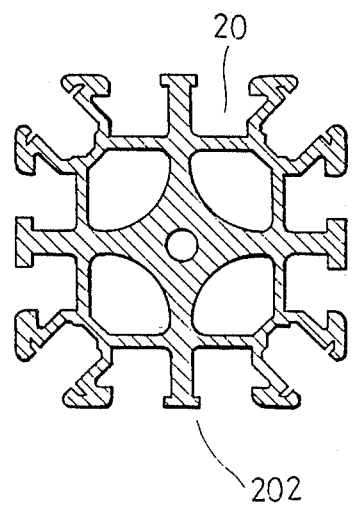
FIG. 18 is a cross-sectional view of a parallel, quadridirectional, hollow skeleton of this invention.
Figure 19:
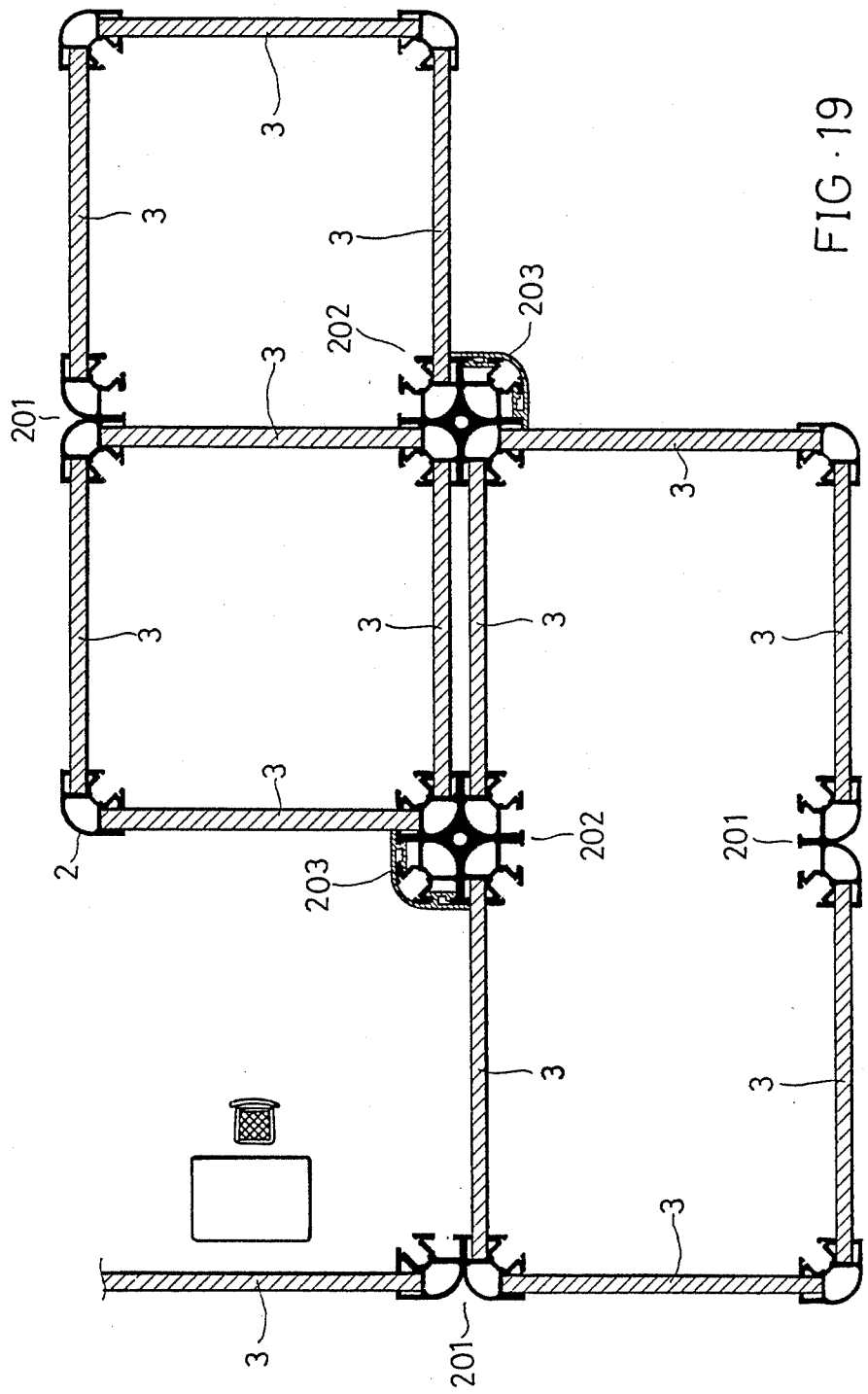
FIG. 19 is a cross-sectional view of a multilateral showcase of this invention.

The aluminum-extruded hollow skeleton 2 of this invention may be made multi-directional. FIG. 17 shows a parallel bidirectional hollow skeleton 201 and FIG. 18 shows a parallel quadri-directional hollow skeleton 202, so that a multi-lateral showcase and compartmented assembly may be made, as shown in FIG. 19 for example, by using the corner connector 1. A decorative plate member 203 may be inserted in the upper and lower ends of grooves 20 of hollow skeleton 2 respectively as shown in FIG. 20 to cover these ends and make them more beautiful when one direction of the parallel quadri-directional hollow skeleton 202 is not used and is exposed as shown in FIG. 19. In addition, a compartmented assembly as shown in FIG. 19 may be made using a skeleton pad 204 as shown in FIG. 21 and the upper and lower support members for providing a plurality of models.

Figure 22:
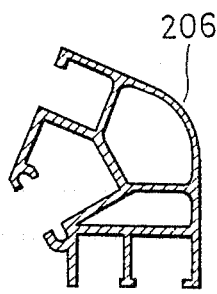
FIG. 22 is a cross-sectional view of a 112.5° angle hollow skeleton of this invention.
Figure 23:
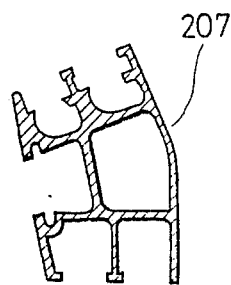
FIG. 23 is a cross-sectional view of a 157.5° angle hollow skeleton of this invention.
Figure 25:
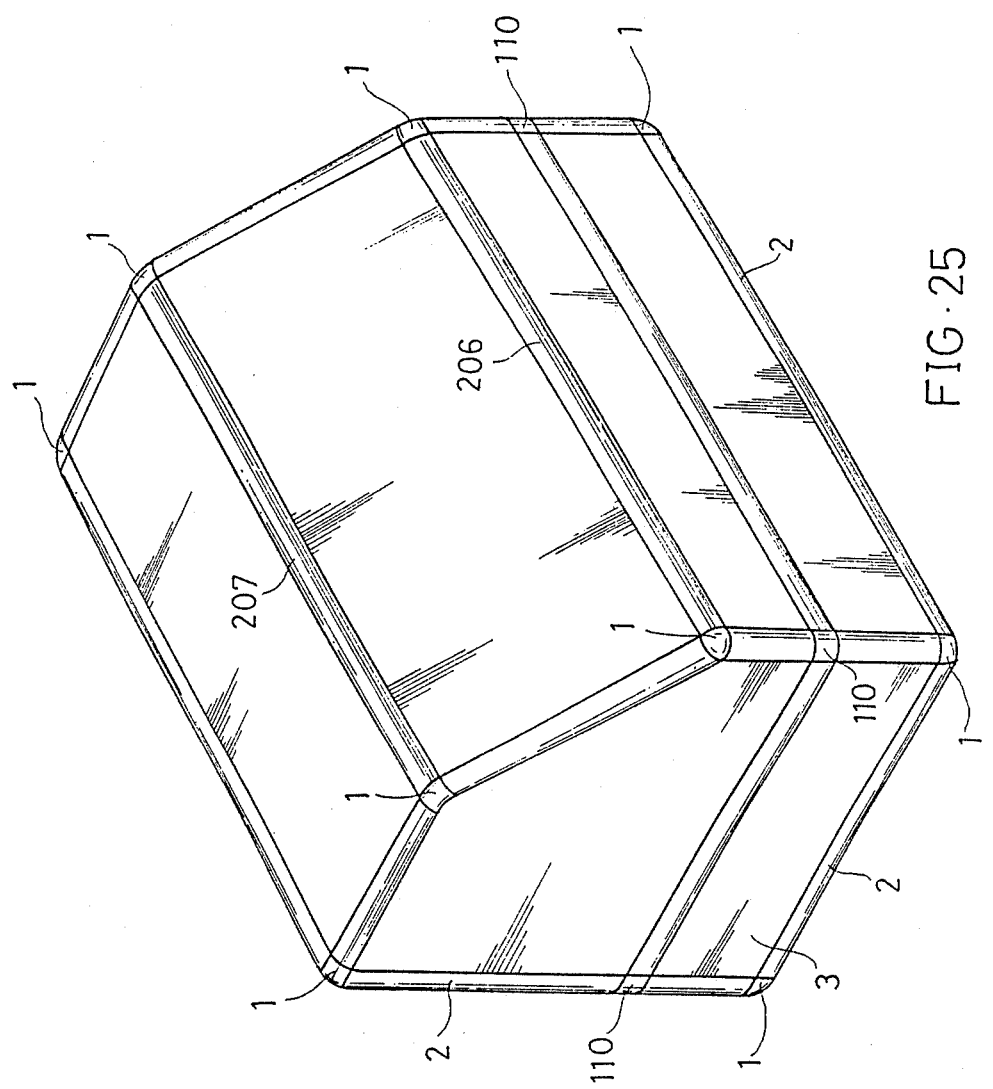
FIG. 25 is a perspective view of an angular desk/cabinet of this invention.
Figure 26:
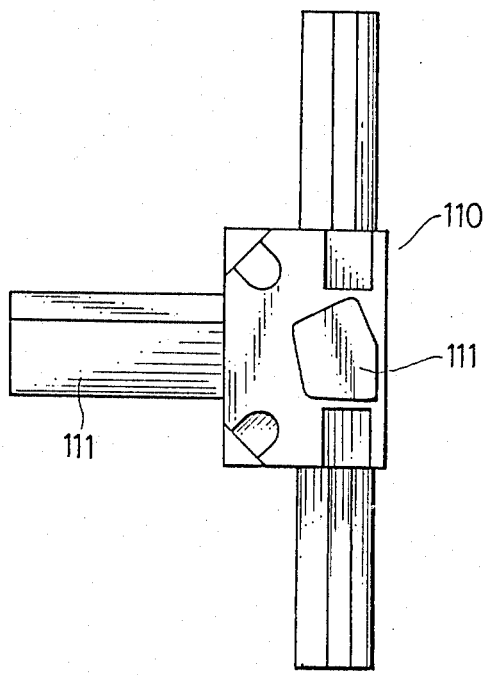
FIG. 26 is a side elevational view of the corner connector of FIG. 24.

The hollow skeleton 2 of this invention may be multi-angular instead of right-angular as shown in FIG. 22 wherein it is a 112.5° skeleton 206 and in FIG. 23 wherein it is a 157.5° skeleton 207. A desk/cabinet with these angles can be combined as shown in FIG. 25 through the quadri-directional corner connector 110 shown in FIG. 24 and the tri-directional corner connector 1 similar thereto. In order to make the combination smooth and the hollow skeletons 206, 207 even and beautiful, the quadri-directional corner connector 110 may be made with an engaging bar 111 having the same inclination as shown in FIG. 26 in keeping with the shape of inserting holes of hollow skeletons 206, 207.

Figure 27:
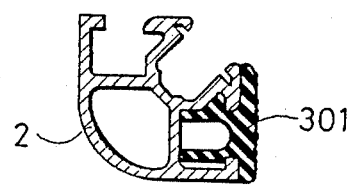
FIG. 27 is a cross-sectional view showing an impact-proof rubber pad of this invention.

An impact-proof rubber pad 301 may be inserted in the plate member inserting groove 20 on the hollow skeleton 2 on the two sides of a push-pull sliding glass door as shown in FIG. 27 so as to prevent the glass from directly colliding with the hollow skeleton 2 on the two sides when opening or closing the glass, and in order to avoid the plate (glass) from directly contacting with the balls (82) to cause abrasion, an abrasion-resistant rubber pad 302 (FIG. 28) may be installed on the bottom end of the plate member (glass) as shown in FIG. 33.

Figure 30:
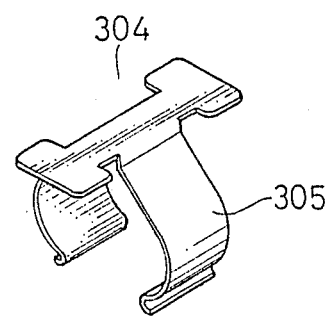
FIG. 30 is a perspective view of an elastic clamp of this invention.
Figure 31:
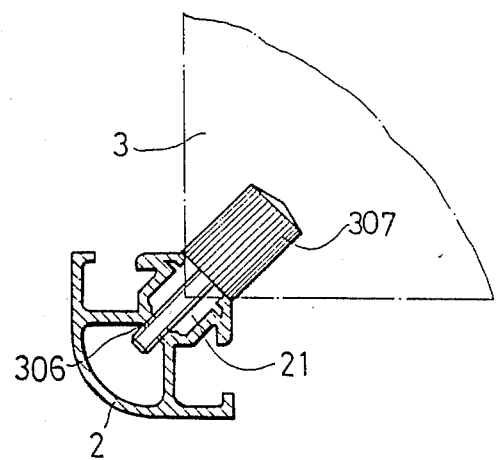
FIG. 31 is a cross-sectional view showing a simple plate member placement structure of this invention.
Figure 32:
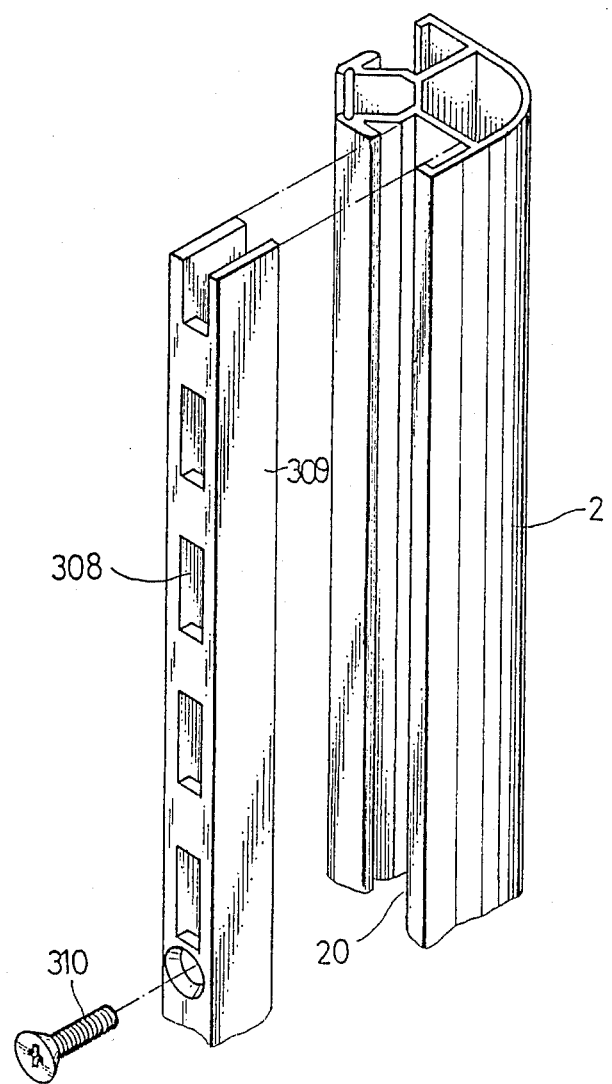
FIG. 32 is a perspective exploded view of a light bar-locking structure of this invention.

To facilitate installing various fluorescent lamp tubes having different specifications such as diameters of different sizes, which occur in different countries, an elastic clamp 304 as shown in FIG. 30 may be inserted in the lamp shade 100 or the slot 21 wherein the fluorescent lamp tube can be clamped by the elastic member 305 on the elastic clamp 304. A screw hole 306 may be provided of a suitable size at the bottom of slot 21 for adjusting and positioning an intermediate layer plate member 3 through locking by a screw 307 as shown in FIG. 31. Furthermore, a light bar 309 with inserting holes 308 capable of being inserted in the plate member inserting groove 20 on the hollow skeleton 2 may be locked at the bottom of inserting groove 20 by a screw 310 in a suitable position on the light bar 309 as shown in FIG. 32 for engaging the support arm 401 of a display shelf.

I claim:

1. In a combination-type desk/cabinet compartment structure having a plurality of corner connectors with projecting connecting bars, a plurality of elongated frame members connected to the corner connectors and a plurality of plate members connected to the frame members, the improvement wherein:
   the elongated frame members are skeletal members each having a hollow tubular portion extending the full length thereof;
   at least two plate member engaging grooves are provided in each frame member, each groove comprising a pair of substantially parallel spaced apart wall members and extending the full length of each frame member parallel to said hollow tubular portion, each groove having central axes extending with respect to each other at an angle between 90° and 180°;
   at least one plate member engaging slot is provided in each corner connector in alignment with at least one of said plate member engaging grooves in a frame member when in the assembled position for supporting engagement with a corner part of a plate member; and
   said projecting connecting bars of said corner connectors have the same shape and projecting direction as said hollow tubular portion on the respective elongated frame member for facilitating inserting said connecting bars in said hollow tubular portion.

2. The improvement as claimed in claim 1 wherein: said at least one plate member engaging slot provided in each corner connector comprises two plate member engaging slots.

3. The improvement as claimed in claim 2 and further comprising:
   an elongated electrical conductor groove in each of said frame members extending the full length thereof parallel to said plate member engaging grooves for receiving at least one electrical conductor therein; and
   electrical conductor groove means in each corner connector aligned with said electrical conductor grooves in the frame members so that the electrical conductor grooves of said frame member connected to a corner connector communicate with each other through said electrical conductor groove means in the respective corner connector.

4. The improvement as claimed in claim 3 and further comprising:
   a resilient pad member engaged in at least one of said plate member engaging grooves in at least one of said frame members.

5. The improvement as claimed in claim 1 and further comprising:
   a retaining lip extending into at least one of said at least two plate member engaging grooves in at least one frame member;
   at least one connecting bar engageable in the hollow tubular portion of an adjacent frame member;
   a hook-shaped end on said at least one connecting bar projecting from the end of said adjacent frame member engageable in said at least one plate member engaging groove and with said retaining lip for connecting said at least one frame member and adjacent frame member together;
   a screw-engaging retaining slot in said at least one connecting bar; and
   a setscrew threadedly engaged in said adjacent frame member and extending into said retaining slot in said at least one connecting bar member for fixing said at least one frame member, at least one connecting bar, and adjacent frame member together.

6. The improvement as claimed in claim 1 further comprising:
   an extension projecting from each of at least some of said elongated frame members from one side of said plate member engaging groove; and
   at least one receiving slot in each of at least some of said plate members for receiving said extensions.

7. The improvement as claimed in claim 6 and further comprising:
   a plurality of holes throgh said extension member on at least one of said elongated frame members adjacent said plate member engaging groove thereof for receiving hole-engaging projections on a bracket; and
   a display shelf bracket having hole-engaging projections on one end thereof for engaging with said holes in said extension member.

8. The improvement as claimed in claim 1 wherein: at least one of said elongated skeletal frame members comprises a multi-directional structure having a plurality of individual parallel extending plate member engaging grooves and hollow tubular portions therein.

9. The improvement as claimed in claim 8 and further comprising:
   a decorative cover member having fixtures thereon engageable in a plate member engaging groove in at least one of said elongated skeletal frame members for providing a decorative cover for an edge of the respective elongated skeletal frame member.

10. In a combination-type desk/cabinet compartment structure having a plurality of corner connectors with projecting connecting bars, a plurality of elongated frame members connected to the corner connectors and a plurality of plate members connected to the frame members, the improvement wherein:

the elongated frame members are skeletal members each having a hollow tubular portion extending the full length thereof;

two plate member engaging grooves are provided in each frame member extending the full length thereof parallel to said hollow tubular portion;

two plate member engaging slots are provided in each corner connector in alignment, respectively, with said two plate member engaging grooves in a respective frame member when in the assembled position for supporting engagement with a corner part of a respective plate member;

ball members are provided in at least one of said plate member engaging grooves provided in at least one of said frame members;

ball-retaining flanges are provided in said at least one plate member engaging groove having said ball members therein extending inwardly into the respective groove to provide a slot extending along said respective groove having a smaller width than the diameter of the ball members so that said ball members cannot pass through the slot, said ball members extending partially through said slot for contacting engagement with a plate member in said respective groove so that said plate member is slidable in said respective groove; and stopping means is provided associated with said respective groove for limiting the rolling movement of said ball members.

11. The improvement as claimed in claim 10 and further comprising:

a resilient rubber impact bumper insertable into at least some of said plate member engaging grooves to prevent the slidable plate member from impacting against respective skeletal frame members.

12. In a combination-type desk/cabinet compartment structure having a plurality of corner connectors with projecting connecting bars, a plurality of elongated frame members connected to the corner connectors and a plurality of plate members connected to the frame members, the improvement wherein:

the elongated frame members are skeletal members each having a hollow tubular portion extending the full length thereof;

at least one plate member engaging groove is provided in each frame member extending the full length thereof parallel to said hollow tubular portion;

at least one plate member engaging slot is provided in each corner connector in alignment with said at least one groove in a frame member when in the assembled position for supporting engagement with a corner part of the plate member;

an elongated electrical conductor groove is provided in at least one of the frame members extending the full length thereof parallel to said at least one plate member engaging groove for receiving an electrical conductor therein;

electrical conductor groove means is provided in each corner connector aligned with said electrical conductor groove in the frame member when assembled for receiving an electrical conductor therein;

an elongated U-cross-sectional-shaped light bar is provided insertable into said electrical conductor groove; and screw means are provided engageable with said light bar and frame member for securing said light bar to said frame member.

13. The improvement as claimed in claim 12 and further comprising:

a bottom portion for said elongated electrical conductor groove in said at least one of the elongated skeletal frame members;

a plurality of screw-threaded holes in said bottom of said elongated electrical conductor groove; and a plurality of screw-threaded members engageable in said screw-threaded holes for adjusting and positioning at least one of said plurality of plate members with a respective frame member.

14. In a combination-type desk/cabinet compartment structure having a plurality of corner connectors with projecting connecting bars, a plurality of elongated frame members connected to the corner connectors and a plurality of plate members connected to the frame members, the improvement wherein:

the elongated frame members are skeletal members each having a hollow tubular portion extending the full length thereof;

at least one plate member engaging groove is provided in each frame member extending the full length thereof parallel to said hollow tubular portion;

at least one plate member engaging slot is provided in each corner connector in alignment with said at least one groove in a frame member when in the assembled position for supporting engagement with a corner part of the plate member;

an extension is provided projecting from each of at least some of said elongated frame members from one side of a respective plate member engaging groove;

at least one receiving slot is provided in each of at least some of said plate members for receiving said extensions; and a plurality of retaining teeth are provided on each of said extensions for engaging with sidewalls of respective receiving slots to retard extraction of each extension member from a respective slot.

* * * * *